(12) United States Patent
Snyder

(10) Patent No.: US 7,996,145 B2
(45) Date of Patent: Aug. 9, 2011

(54) METHOD AND APPARATUS TO CONTROL ENGINE RESTART FOR A HYBRID POWERTRAIN SYSTEM

(75) Inventor: Bryan R. Snyder, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 371 days.

(21) Appl. No.: 11/743,919

(22) Filed: May 3, 2007

(65) Prior Publication Data
US 2008/0275624 A1 Nov. 6, 2008

(51) Int. Cl.
G06F 9/00 (2006.01)
H02K 23/52 (2006.01)

(52) U.S. Cl. .......... 701/104; 701/105; 701/113; 290/18; 903/905; 123/179.5

(58) Field of Classification Search .................. 701/104, 701/105, 112, 113, 115; 477/3, 6; 903/905; 290/18; 180/65.1–65.4; 123/179.3–179.5, 123/179.16
See application file for complete search history.

(56) References Cited

U.S. PATENT DOCUMENTS

| | | | |
|---|---|---|---|
| 6,209,672 B1 * | 4/2001 | Severinsky | 180/65.23 |
| 6,253,127 B1 * | 6/2001 | Itoyama et al. | 701/22 |
| 6,307,277 B1 * | 10/2001 | Tamai et al. | 290/40 C |
| 6,464,026 B1 * | 10/2002 | Horsley et al. | 180/65.2 |
| 6,616,569 B2 * | 9/2003 | Hoang et al. | 477/3 |
| 6,832,148 B1 | 12/2004 | Bennett | |
| 6,868,318 B1 | 3/2005 | Cawthorne | |
| 7,104,347 B2 * | 9/2006 | Severinsky et al. | 180/65.23 |
| 7,124,743 B2 * | 10/2006 | Gonzales et al. | 123/491 |
| 7,154,236 B1 | 12/2006 | Heap | |
| 7,220,217 B2 * | 5/2007 | Tamai et al. | 477/183 |
| 7,281,509 B2 * | 10/2007 | Fukui et al. | 123/179.16 |
| 7,367,415 B2 * | 5/2008 | Oliver et al. | 180/65.275 |
| 7,438,042 B1 * | 10/2008 | Kawada | 123/198 B |
| 7,440,827 B2 * | 10/2008 | Kawada et al. | 701/22 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |

(Continued)

*Primary Examiner* — Willis R Wolfe, Jr.
*Assistant Examiner* — Johnny H Hoang

(57) ABSTRACT

There is provided a control scheme for restarting an internal combustion engine of a hybrid powertrain during ongoing vehicle operation. The method includes generating a torque output from an electrical machine to rotate the engine, and determining an engine crank torque. The torque output from the electrical machine is selectively controlled based upon the engine crank torque. The engine is fired when rotational speed of the engine exceeds a threshold. An engine torque simulation model accurately determines engine compression pressures in real-time to accommodate changes in engine operating conditions, based upon present engine operating conditions.

22 Claims, 3 Drawing Sheets

U.S. PATENT DOCUMENTS

| | | |
|---|---|---|
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0233332 A1* | 10/2007 | Kawada et al. ................ 701/13 |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0112412 A1 | 4/2009 | Cawthorne |
| 2009/0118917 A1 | 5/2009 | Sah |
| 2009/0144002 A1 | 6/2009 | Zettel |

* cited by examiner

METHOD AND APPARATUS TO CONTROL ENGINE RESTART FOR A HYBRID POWERTRAIN SYSTEM

TECHNICAL FIELD

This invention pertains generally to control systems for powertrain control systems employing electro-mechanical transmissions.

BACKGROUND OF THE INVENTION

Hybrid powertrain architectures comprise torque-generative devices, including internal combustion engines and electric machines, which transmit torque through a transmission device to a vehicle driveline. A hybrid powertrain architecture reduces fuel consumption through the engine by shutting off the engine at opportune moments during ongoing vehicle operation, including events such as the vehicle stopped at a light or in traffic, or when the vehicle is operating on a downhill portion of a highway. A powertrain architecture includes, e.g., an engine and transmission system controlled and mechanized to shut off the engine, and restart it using a belt drive through an alternator, often referred to as a belt-alternator-starter (BAS) device. Other powertrain architectures include engine and transmission systems wherein one or more electrical motors generate motive torque which is transmitted to the vehicle driveline directly or through the transmission.

One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

The exemplary electro-mechanical transmissions are selectively operative in fixed gear modes and continuously variable modes through actuation of the torque-transfer clutches, typically employing a hydraulic circuit to effect clutch actuation, including fixed gear modes and continuously variable modes. Engineers implementing powertrain systems having electro-mechanical transmissions are tasked with implementing control schemes to monitor system states and control operation of various systems and actuators to effectively control powertrain operation.

Operation of the powertrain system includes selectively starting and stopping operation of the internal combustion engine. Engine starting can be operator-initiated, wherein the vehicle operator starts the engine by way of a key-on and crank action. Engine starting further comprises automatic engine restarting events during ongoing vehicle operation, wherein the engine is automatically started by the control system. This can be in response to an operator action, such as an accelerator pedal tip-in, or, in response to a control system determination of a need to start the engine and referred to as a quiescent auto-start event. The control system selectively starts and stops operation of the internal combustion engine to optimize energy efficiency, and for other reasons.

During a restart event, compression torque pulses are generated in individual engine cylinders and transmitted to a transmission torque damper and the engine block, which may result in objectionable vibrations reaching the vehicle operator, especially at resonant frequencies for the powertrain and various driveline components. Furthermore, the compression torque pulses can disturb engine output torque and can result in objectionable audible noise. The magnitude of the vibration can be sufficiently great enough to overwhelm feedback damping control systems.

Some current systems for damping engine compression pulses include feed-forward control systems, which attempt to predict the magnitude of the disturbance and provide pre-emptive corrective actions. These systems include engine models that pre-calibrate compression torque disturbances off-line. Such a system requires a minimal amount of real-time computation, but can have poor accuracy, due to variations in real-time operating conditions that affect compression pressures including atmospheric pressure, engine speed profile, and initial engine crank angle.

Therefore, there is a need for a control scheme which effectively addresses vibrations caused during starting of an internal combustion engine, including an engine that is an element of a powertrain system having an electro-mechanical transmission and electrical machines. Such a system is described hereinafter.

SUMMARY OF THE INVENTION

In accordance with an embodiment of the invention, a control scheme is provided for restarting an internal combustion engine of a hybrid powertrain during ongoing vehicle operation. The method comprises generating a torque output from an electrical machine to rotate the engine, and determining an engine crank torque. The torque output from the electrical machine is selectively controlled based upon the engine crank torque. The engine is fired when rotational speed of the engine exceeds a threshold.

An aspect of the invention includes an engine torque simulation model to accurately determine engine compression pressures in real-time to accommodate changes in engine operating conditions, based upon present engine operating conditions.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
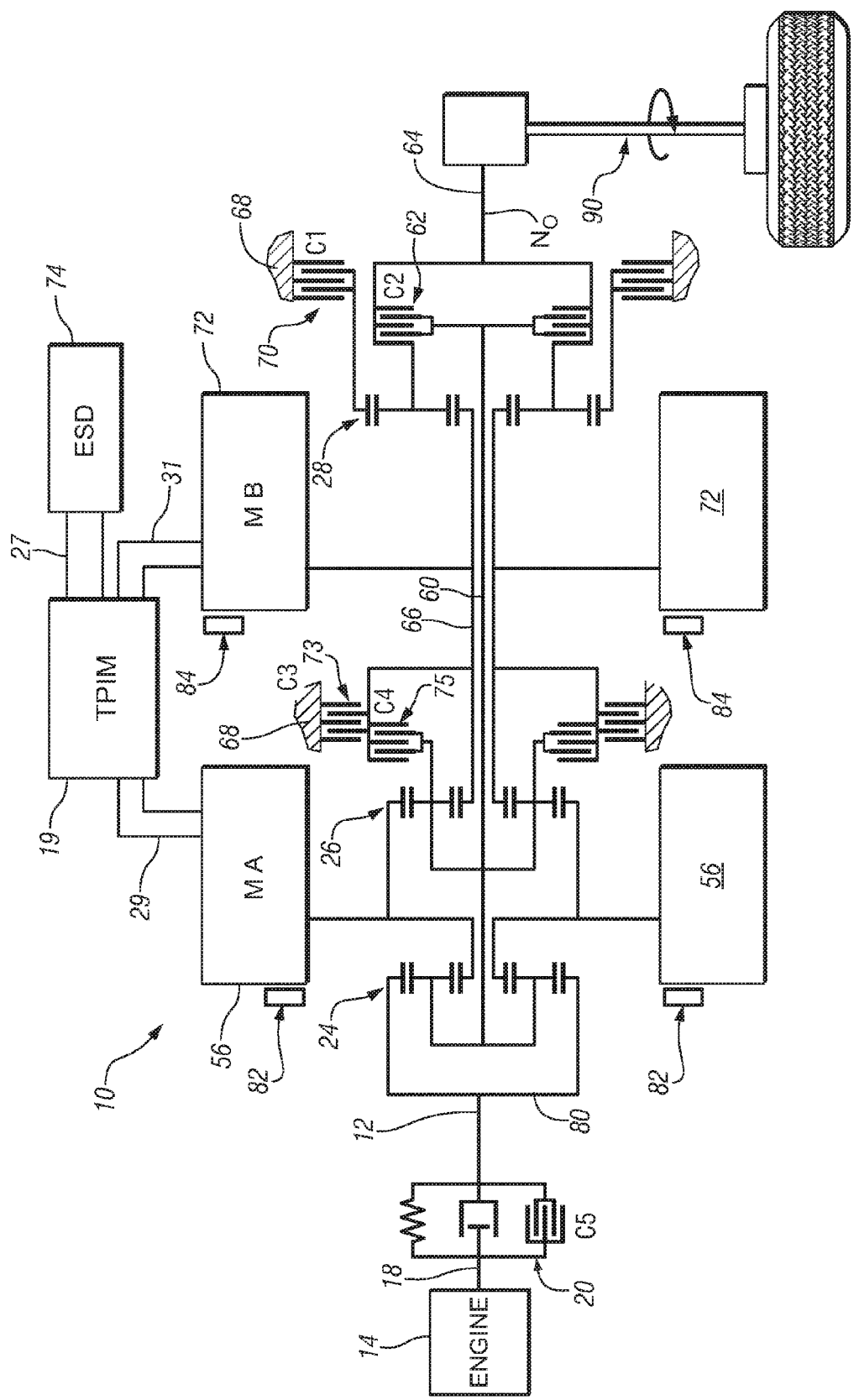
FIG. 1 is a schematic diagram of an exemplary powertrain, in accordance with the present invention.
Figure 2:
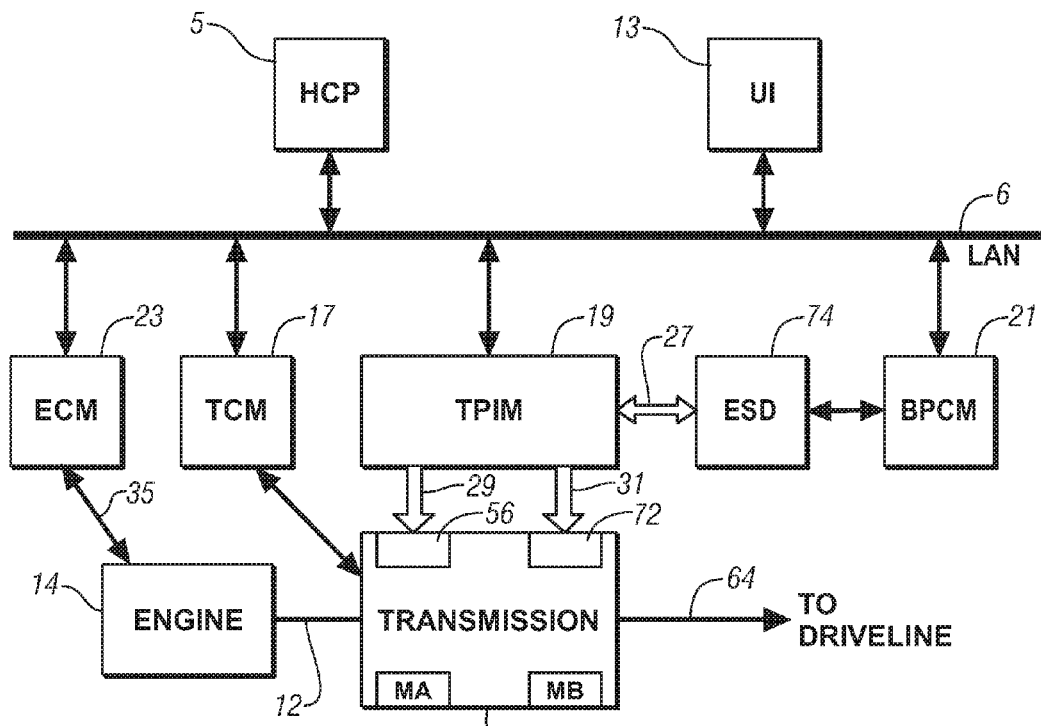
FIG. 2 is a schematic diagram of an exemplary architecture for a control system and powertrain, in accordance with the present invention; and, FIGS. 3 and 4 are graphical depictions, in accordance with the present invention.

The drawings are now described, wherein the depictions are for the purpose of illustrating the invention only and not for the purpose of limiting the same. Referring now to FIGS. 1 and 2 a system illustrative of the invention is depicted, comprising an engine 14, transmission 10, control system, and driveline. The exemplary two-mode, compound-split, electro-mechanical hybrid transmission embodying the concepts of the present invention is depicted in FIG. 1, and is designated generally by the numeral 10. Mechanical aspects of transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The transmission 10 includes an input shaft 12 having an input speed, $N_I$ that is preferably driven by the internal combustion engine 14. The engine 14 has a crankshaft operatively connected via shaft 18 to a lockable torque damper device 20 operative to transmit torque to the transmission input shaft 12. The lockable torque damper device includes clutch C5, which locks the torque damper device 20, thus transmitting torque directly between the engine and the input shaft 12 of the transmission. The engine has characteristic speed $N_E$ and output torque $T_E$. When the damper device 20 is locked, the engine speed $N_E$ and output torque $T_E$ are effectively equal to the transmission input speed $N_I$ and input torque $T_I$, with any differences comprising twisting of the components therebetween.

The transmission 10 utilizes three planetary-gear sets 24, 26 and 28, and four torque-transmitting devices, i.e., clutches C1 70, C2 62, C3 73, and C4 75, with the input shaft 12 connected to the first planetary gear set 24 via carrier 80. Clutches C2 and C4 preferably comprise hydraulically-actuated rotating friction clutches. Clutches C1 and C3 preferably comprise comprising hydraulically-actuated stationary devices grounded to the transmission case 68.

There is a first electrical machine comprising a motor/generator 56, referred to as MA, and a second electrical machine comprising a motor/generator 72, referred to as MB operatively connected to the transmission via the planetary gears. Rotational positions of MA and MB are measured using resolvers 82 and 84, respectively, which are known electrical devices each comprising a stator and rotor which are operative to measure position of the electrical machines. Transmission output shaft 64 is operably connected to a vehicle driveline 90 to provide motive output torque, $T_O$ at output speed $N_O$ to vehicle wheels.

The transmission 10 receives input torque from the torque-generative devices, including the engine 14 and the MA 56 and MB 72, and referred to as '$T_I$', '$T_A$', and '$T_B$' respectively, as a result of energy conversion from fuel or electrical potential stored in an electrical energy storage device (ESD) 74. The ESD 74 is high voltage DC-coupled to transmission power inverter module ('TPIM') 19 via DC transfer conductors 27. The TPIM 19 is an element of the control system described hereinafter with regard to FIG. 2. The TPIM 19 transmits electrical energy to and from MA 56 by transfer conductors 29, and the TPIM 19 similarly transmits electrical energy to and from MB 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality. Preferably, MA 56 and MB 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising distributed control module architecture, is shown. The elements described hereinafter comprise a subset of overall vehicle control architecture, and are operable to provide coordinated system control of the powertrain system described herein. The control system synthesizes pertinent information and inputs, and executes algorithms to control various actuators to achieve control targets, including such parameters as fuel economy, emissions, performance, driveability, and protection of hardware, including batteries of ESD 74 and MA and MB 56, 72. The distributed control module architecture includes engine control module ('ECM') 23, transmission control module ('TCM') 17, battery pack control module ('BPCM') 21, and TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UT 13 and the powertrain, including the battery pack, the HCP 5 generates various commands, including: an operator torque request ('$T_{O\_REQ}$') output to driveline 90, the input torque $T_I$ originating from the engine, clutch torque, ('$T_{CL\_N}$') for the N various torque-transfer clutches C1, C2, C3, C4 of the transmission 10; and motor torques $T_A$ and $T_B$ for MA and MB. The TCM 17 is operatively connected to the electro-hydraulic control circuit 42, including monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual input torque, $T_I$, to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_E$, to shaft 12 which translate to transmission input speed, $N_I$, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques for each of the N clutches, i.e., C1, C2, C3, and C4, and rotational speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge ('SOC'), battery voltage and available battery power, referred to as a range $P_{BAT\_MIN}$ to $P_{BAT\_MAX}$.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds (msec) during ongoing engine and vehicle operation. Alternatively, algorithms may be executed in response to occurrence of an event.

The exemplary two-mode, compound-split, electro-mechanical transmission operates in several fixed gear operating modes and continuously variable operating modes, described with reference to FIG. 1, and Table 1, below.

TABLE 1

| Transmission Operating Range State | Actuated Clutches | |
| --- | --- | --- |
| Mode 1 - Engine Off (M1_Eng_Off) | C1 | |
| Mode 1 - Engine On (M1_Eng_On) | C1 | |
| Fixed Ratio 1 (GR1) | C1 | C4 |
| Fixed Ratio 2 (GR2) | C1 | C2 |
| Mode 2 - Engine Off (M2_Eng_Off) | C2 | |
| Mode 2 - Engine On (M2_Eng_On) | C2 | |
| Fixed Ratio 3 (GR3) | C2 | C4 |
| Fixed Ratio 4 (GR4) | C2 | C3 |

The various transmission operating range states described in Table 1 indicate which of the specific clutches C1, C2, C3, and C4 are engaged or actuated for each of the operating range states. A first mode, i.e., Mode 1, is selected when clutch C1 70 is actuated in order to "ground" the outer gear member of the third planetary gear set 28. The engine 14 can be either on or off. A second mode, i.e., Mode 2, is selected when clutch C1 70 is released and clutch C2 62 is simultaneously actuated to connect the shaft 60 to the carrier of the third planetary gear set 28. Again, the engine 14 can be either on or off. Other factors outside the scope of the invention affect when the electrical machines 56, 72 operate as motors and generators, and are not discussed herein.

The first and second continuously variable modes of operation refer to circumstances in which the transmission functions are controlled by one clutch, i.e., either clutch C1 62 or C2 70, and by the controlled speed and torque of the electrical machines 56 and 72. Certain ranges of operation comprise fixed gear ratios achieved by applying an additional clutch. This additional clutch may be clutch C3 73 or C4 75, as shown in the table, above. When the additional clutch is applied, fixed ratio operation of input-to-output speed of the transmission, i.e., $N_I/N_O$, is achieved. The rotations of machines MA and MB 56, 72 are dependent on internal rotation of the mechanism as defined by the clutching and proportional to the input speed measured at shaft 12.

In response to an operator's action, as captured by the UI 13, the supervisory HCP control module 5 and one or more of the other control modules determine the operator torque request $T_{O\_REQ}$, to be executed at shaft 64. Final vehicle acceleration is affected by other factors, including, e.g., road load, road grade, and vehicle mass. The operating mode is determined for the exemplary transmission based upon a variety of operating characteristics of the powertrain. This includes an operator demand for torque, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electrical machines in an electrical energy generating mode or in a torque generating mode. The operating mode can be determined by an optimization algorithm or routine which determines optimum system efficiency based upon operator demand for power, battery state of charge, and energy efficiencies of the engine 14 and MA and MB 56, 72. The control system manages torque inputs from the engine 14 and MA and MB 56, 72 based upon an outcome of the executed optimization routine, and system optimization occurs to optimize system efficiencies to improve fuel economy and manage battery charging. Furthermore, operation can be determined based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

The exemplary engine 14 comprises a multi-cylinder internal combustion engine selectively operative in several states to transmit torque to the transmission via shaft 12, and can be either a spark-ignition or a compression-ignition engine. The exemplary engine states comprise normal engine operation ('ALL_CYL'), engine operation with deactivated cylinders ('DEACT'), engine fuel-cutoff ('FCO'), engine fuel-cutoff with cylinder deactivation ('FCO_DEACT'), and engine-off ('OFF'). In normal engine operation, all the engine cylinders are fueled and fired. In the cylinder deactivation state, typically half of the cylinders, e.g., one bank of a V-configured engine, are deactivated. A bank of cylinders is typically deactivated by discontinuing fuel delivery thereto and selectively leaving open exhaust valves to reduce engine pumping losses. In the engine fuel-cutoff state, fuel delivery to all the cylinders is discontinued. In the engine fuel-cutoff with cylinder deactivation state, fuel delivery to all the cylinders is discontinued and a bank of the cylinders is deactivated to reduce pumping losses. The engine-off state is defined by engine input speed, $N_E$, being equal to zero revolutions per minute (RPM), i.e., the engine crankshaft is not rotating.

The control scheme to restart the internal combustion engine during ongoing vehicle operation subsequent to an engine-stop action is now described with reference to the exemplary hybrid powertrain system of FIGS. 1 and 2. The control scheme is executed in one or more of the control modules as machine-executable code operative to control elements of the hybrid powertrain to generate torque output from the electrical machines to rotate the engine which is not firing. Engine crank torque is determined, in real-time, taking into account current operating and ambient conditions. The torque outputs from the electrical machines are selectively controlled based upon the engine crank torque. The engine is fired when rotational speed of the engine exceeds a threshold, typically based upon concerns related to vehicle and powertrain vibrations. This process takes about 500 msec. This operation is now described in detail.

The restart event is initiated by a command from the HCP 5, in response to actions in the powertrain system which necessitate engine torque input to the powertrain, including decisions based upon exceeding system-imposed limits, and decisions based upon operator torque demands. The system-imposed limits comprise operating parameters of vehicle speed, battery SOC, battery temperature, battery power capability, battery voltages, engine coolant temperature, system thermal limits, and system diagnostics. Each of these operating parameters are monitored by one or more of the control modules, and a decision to restart the engine can be based upon one of the parameters exceeding a predetermined threshold, or a combination of the parameters exceeding predetermined thresholds coincident to one another. Decisions to restart the engine based upon operator torque demands comprise the operator torque request, $T_{O\_REQ}$, and predictive control logic which review current operating conditions. A decision to restart the engine can occur during a vehicle launch request or a vehicle acceleration request, and is based upon a change in the operator torque request, $T_{O\_REQ}$, relative to current operating conditions and torque limits of the electrical motors MA and MB.

Each decision to restart the engine includes a debounce analysis of engine start/stop events, effectively adding a hysteresis to each starting event. The debounce analysis includes, for example, associating the operator input to an engine start being initiated based upon efficiency calculations. Thus engine restarts are avoided that would be unexpected by the vehicle operator, e.g., not starting the engine when the operator is releasing the accelerator pedal.

Figure 3:
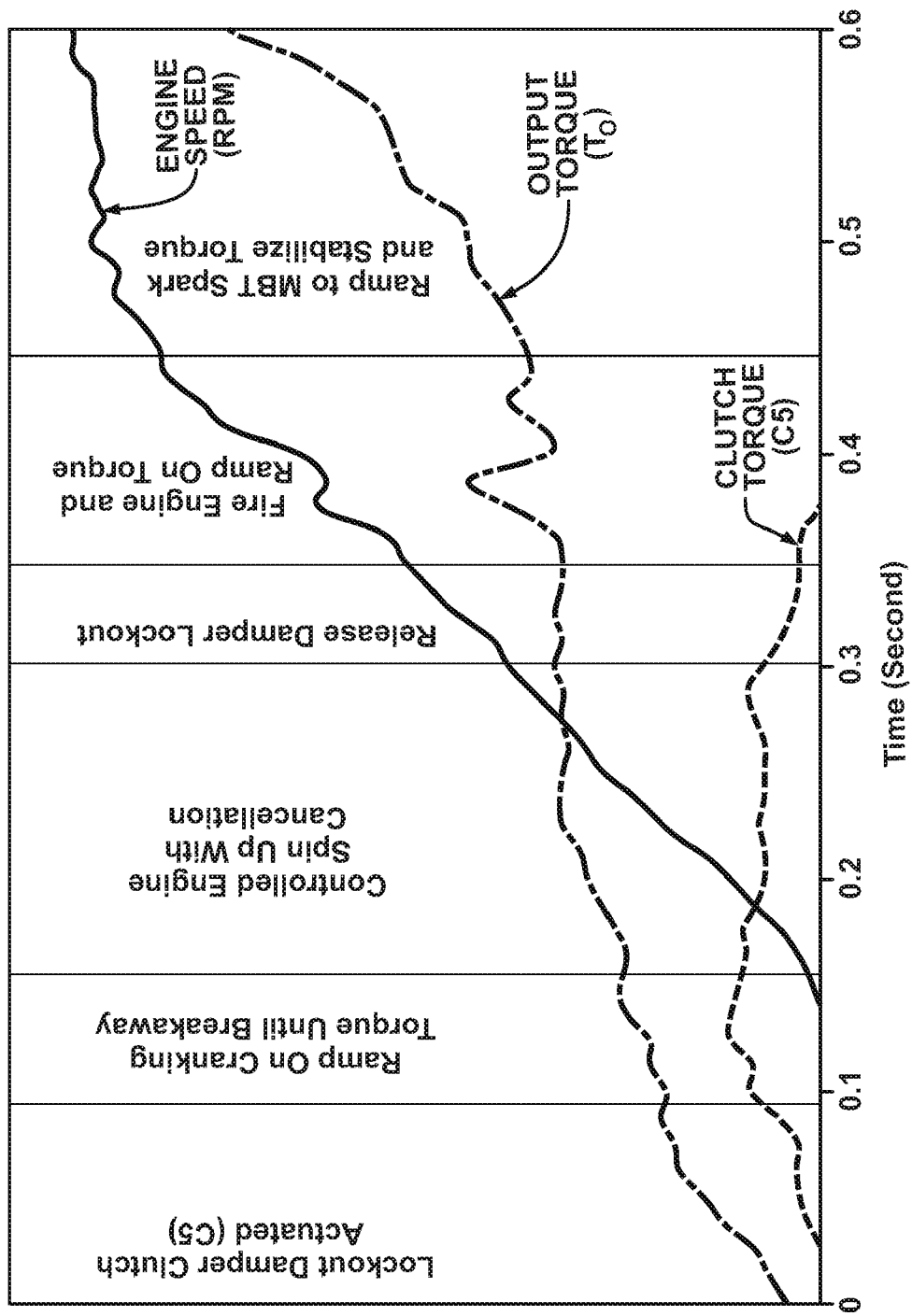

Referring to FIG. 3, a datagraph is now described detailing engine operating parameters during the restarting of the engine 14, depicted as a function of elapsed time. Prior to and in anticipation of the engine restart, the damper clutch C5 is locked, resulting in a direct mechanical connection between the engine crankshaft and MA 56 through the transmission gears. The damper clutch C5 is preferably locked during an immediately preceding engine stop event to maintain the engine crank angle measurement using a crank position sensor (not shown) consistent with the electric motor angle measurement using resolvers 82 and 84. The locked damper clutch ensures there is no relative rotational movement of the electric machine 56 and the engine 14 beyond torsionals induced along the shaft 12 and the engine crankshaft. In this manner, engine position is redundantly monitored by electrical machine position, measured by resolvers 82 and 84. Co-pending U.S. patent application Ser. No. 11/745,901 entitled METHOD AND APPARATUS TO DETERMINE ROTATIONAL POSITION OF AN INTERNAL COMBUSTION ENGINE, provides additional details related to using the resolvers to determine engine position, the contents of which are hereby incorporated by reference. The position information from the resolvers 82 and 84 provide an absolute measurement of engine position and has higher measurement resolution than the crank position sensor. The resolvers 82 and 84 are operative to provide an accurate measure of shaft angle immediately upon application of electrical power and continuously during ongoing operation, effecting improved control and accuracy.

The action of locking clutch C5 to lockout the damper 20 enables the control system to cancel oscillations occurring at critical system frequencies by actively controlling torque outputs from the electrical motors. Critical frequencies at which there is typically resonance include vehicle rocking occurring at about 2 Hz (30 rpm) driveline resonance occurring at about 4 Hz (60 rpm), powertrain mount resonance at about 14 Hz (200 rpm), and damper resonance at about 9 to 12 Hz (125 rpm). An upper range for unlocking the damper comprises shaft resonance, which occurs at about 60 Hz (800 rpm). The locking clutch is preferably unlocked prior to reaching the shaft resonant frequency, thus permitting the damper to absorb and accommodate vibration occurring thereat. Therefore, it is preferable to release clutch C5 at about 500 rpm, with the engine torque cancellation scheme described hereinafter ramped out at or before that point. The damper clutch C5 is preferably unlocked prior to firing the engine.

Engine crank torque, referred to as $T_f(crank)$, comprises a measure of torque required to spin the engine prior to firing the engine. The engine crank torque comprises a sum of the cylinder torques calculated for each cylinder, and is preferably determined by executing a simulation model in the control system. The simulation model calculates, in real-time, a cylinder pressure for each cylinder as a function of the engine crank angle. The cylinder pressure is based upon compression pulses generated by the action of crankshaft rotation wherein movement of each piston in each engine cylinder is resisted by air trapped within the combustion chamber of the cylinder, the resistance determined by positions of intake and exhaust valves of the engine. Each cylinder torque is determined by multiplying a torque ratio by the cylinder pressure. The torque ratio is determined for each cylinder as a function of crank angle, which encompasses changes in cylinder geometry and cylinder friction. The torque ratio is preferably a pre-calibrated array of values stored in memory, and retrievable as based upon crank angle. An exemplary method to determine the engine crank torque using a simulation model is described in co-pending U.S. patent application Ser. No. 11/669,552 entitled METHOD AND APPARATUS TO DETERMINE PRESSURE IN AN UNFIRED COMBUSTION CHAMBER, which is incorporated by reference herein. The exemplary simulation model is preferably executed in one of the control modules, and determines a parametric value for the engine crank torque $T_f(crank)$ during each 6.25 msec loop. The exemplary simulation model adapts to changing operating and ambient conditions, and determines parametric values for the engine crank torque $T_f(crank)$ at or before the point in time at which the electric machines act to restart the engine by spinning the crankshaft.

The torque outputs from the electrical machines are selectively controlled based upon the engine crank torque, to generate motor torques $T_A$, $T_B$, sufficient to overcome the engine crank torque $T_I(\text{crank})$ and ramp up input speed of the engine according to a preferred engine input speed profile $N_{I\_DOT}$. The exemplary system is operating in Mode 1 operation with only clutch C1 actuated at the period in time during which the engine is restarted. The motor torques $T_A$, $T_B$ for spinning the engine are preferably ramped in according to a predetermined torque ramping scheme. The output torque is transmitted across clutch C5, to the engine, inducing torque across the clutch C5 and torque on the engine crankshaft, overcoming the static friction of various components of the engine. The engine breaks away and begins to rotate after a period of time in the range of 100 to 200 msec after torque is applied from the electrical machines. At a point prior to the engine breaking away, the control system begins determining the engine crank torque $T_I(\text{crank})$. Operations of the electrical machines are controlled to steadily increase the input speed, $N_I$, according to the input speed profile, $N_{I\_DOT}$. After the engine speed exceeds a minimum threshold, typically in the range of 500 to 700 rpm, the damper clutch C5 is released, permitting the damper 20 to function to dampen torque vibrations between the engine 14 and the transmission 10.

Torque outputs, $T_A$, $T_B$ of the electrical machines MA and MB are controlled during engine spin-up to effectively cancel the compression pulses generated in each engine cylinder, as the compression pulses determined by the simulation model previously described. The compression pulses are most discernible at resonant frequencies of components of the driveline. The control system acts to cancel the cylinder compression pulses by controlling the torque outputs using a feed-forward control scheme, based upon the real-time estimation of engine crank torque.

System torque control and management is preferably controlled using the torque relationship described in Eq. 1, below:

$$\begin{bmatrix} T_A \\ T_B \end{bmatrix} = \begin{bmatrix} k11 & k12 & k13 & k14 \\ k21 & k22 & k23 & k24 \end{bmatrix} * \begin{bmatrix} T_I \\ T_O \\ N_{I\_DOT} \\ N_{O\_DOT} \end{bmatrix} \quad [1]$$

wherein:

$T_A$ is torque for MA; $T_B$ is torque for MB;

$T_I$ is input torque to the transmission at shaft 12, and is based upon the engine crank torque $T_I(\text{crank})$ described above;

$T_O$ is output torque from the transmission at shaft 64;

$N_{I\_DOT}$ is the input speed profile of the input shaft 12 to the transmission;

$N_{O\_DOT}$ is output speed profile of the output shaft 64 of the transmission, indicative of vehicle acceleration; and, kn comprises a 2×4 matrix of parameters determined by transmission hardware gear and shaft interconnections and estimated hardware inertias applicable to the current drive range.

Torques $T_A$ and $T_B$ are bounded by minimum and maximum limits, $T_{A\_MAX}$, $T_{A\_MIN}$, $T_{B\_MAX}$, $T_{B\_MIN}$, (depicted in FIG. 4), and which comprise limits imposed by constraints on the battery or ESD 74. The substance of Eq. 1 is preferably converted to an algorithm resident in one of the control modules and executed during each 6.25 msec loop cycle. The control scheme is to determine and implement preferred parametric control values for motor torques $T_A$, $T_B$ as described.

The invention comprises the control scheme for restarting the internal combustion engine during ongoing vehicle operation subsequent to an engine shutdown event. The control scheme is preferably executed in the control modules to control elements of the hybrid powertrain. The program comprises sequentially executed steps, wherein each step is preferably substantially completed prior to executing a subsequent step. The damper clutch 20 preferably locks rotation of the engine 14 to the electro-mechanical transmission 10 when the engine is stopped. Subsequent to stopping the engine, a torque output is generated from one of the electrical machines to rotate the engine. An engine crank torque is determined, and torque output from the electrical machine is controlled based upon the engine crank torque. The engine is fired when rotational speed of the engine exceeds a threshold.

Figure 4:
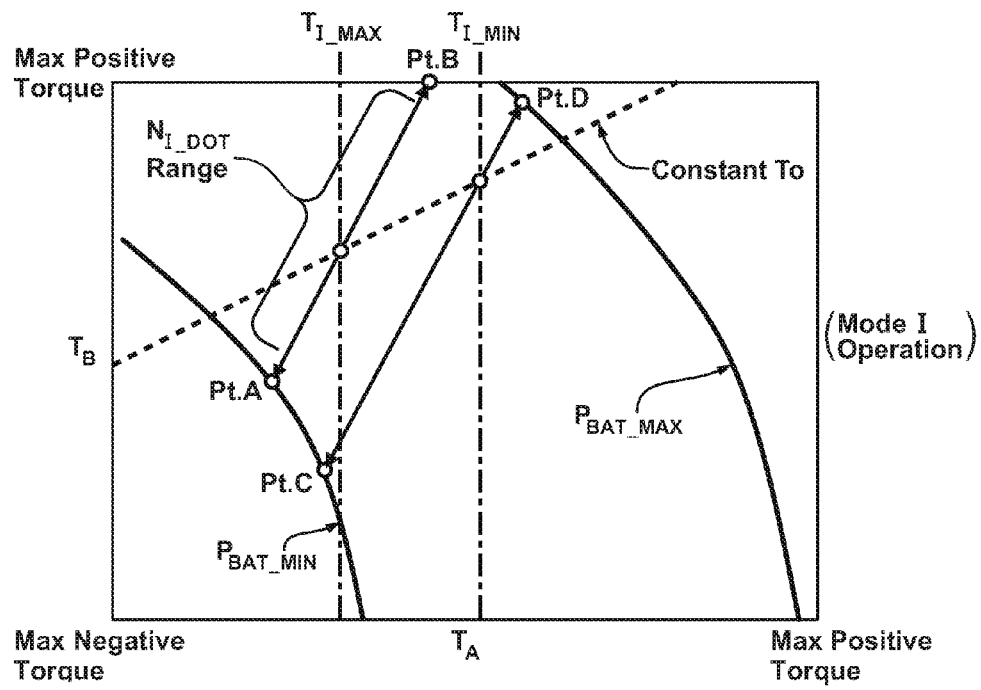

Referring to FIG. 4, a graphical depiction of an operating region for the exemplary system is shown, for operating the system in the continuously variable Mode 1 operation. A first operating space is defined, by a torque output range for MA 56 ($T_{A\_MIN}$, $T_{A\_MAX}$) plotted on the x-axis and a torque output range for MB 72 ($T_{B\_MIN}$, $T_{B\_MAX}$) plotted on the y-axis. The torque output ranges are limited by a second operating space, defined based upon battery power limitations, i.e., $P_{BAT\_MIN}$ and $P_{BAT\_MAX}$. Based upon the relationship described with reference to Eq. 1, for a given fixed or constant output torque, $T_O$, and the preferred ranges for input speed profile, $N_{I\_DOT}$, there is an allowable range of input torques, $T_{I\_MIN}$ to $T_{I\_MAX}$, which can be generated and transmitted to the engine to spin the engine to meet the input speed profile $N_{I\_DOT}$ in anticipation of firing the engine. The control scheme described herein operates the electrical machines MA and MB to generate input crank torque, $T_I(\text{crank})$ to the engine which meets the constraints described, and further to accommodate and adjust for compression pulses resulting from rotation of the engine and determined by the previously described cylinder pressure model.

Thus, in the embodiment described, starting the engine 14 includes generating initial torque values for $T_A$ and $T_B$, based upon known and selected values for $T_I$, $T_O$, and $N_{I\_DOT}$, and $N_{O\_DOT}$ using Eq. 1. At initiation of the engine start, the input speed profile $N_{I\_DOT}$ is determined based upon a preferred elapsed time to start the engine, within the allowable profile $N_{I\_DOT}$ operating window discernible in FIG. 4 which achieves the preferred operating speed within the limits for $T_A$ and $T_B$. Output torque $T_O$ and output speed profile $N_{O\_DOT}$ are previously determined values, and $T_I$ comprises engine crank torque $T_I(\text{crank})$, estimated using the simulation model. The electrical machines MA and MB are controlled through the TPIM to deliver the determined torque values for $T_A$ and $T_B$, and the process is repeated for each cycle of the 6.25 msec loop cycle as the engine speed increases according to the engine input speed profile $N_{I\_DOT}$. Thus the control system controls torque outputs for MA and MB.

The engine is fired when rotational speed of the engine exceeds a threshold, typically based upon concerns related to vehicle and powertrain vibrations. The ECM starts the exemplary spark-ignition engine by controlling supply of fuel and spark to fire the engine. When the engine is fired, engine torque is transmitted to the input shaft of the transmission. Firing the engine comprises delivering fuel and spark ignition thereto at an engine operating point which generates a minimal torque, to minimize torque disturbances to the vehicle driveline, typically at a spark timing of about 10 degrees after top-dead-center (aTDC). Engine torque is ramped to a mean-best-torque (MBT) value through control of ignition timing to stabilize engine torque, $T_I$. The control system preferably discontinues execution of the engine crank torque simulation model and accompanying motor torque compensation and control prior to firing the engine.

Specific alternate embodiments include hybrid systems employing a single electrical machine that is selectively operatively connected to the engine to control crank rotation, including e.g., a belt-alternator-starter powertrain and an electro-mechanical transmission system employing a single electrical machine for torque and electrical energy generation. Another alternate embodiment comprises use of a compression-ignition engine, wherein the engine starting sequence uses fuel delivery timing and quantity to effect the starting and torque output from the engine, which is known to a skilled practitioner.

The control scheme comprises a method for controlling elements of the hybrid powertrain to generate a torque output from an electrical machine to rotate the engine which is not operating. Engine crank torque is determined, in real-time, taking into account current operating and ambient conditions. The torque output from the electrical machine is selectively controlled based upon the engine crank torque. The engine is fired when rotational speed of the engine exceeds a threshold, typically based upon concerns related to vehicle and powertrain vibrations. This is now described in detail with reference to a specific embodiment illustrative of the invention.

It is understood that modifications in the hardware are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for restarting an internal combustion engine of a hybrid powertrain during ongoing vehicle operation, the method comprising:
    generating a torque output from an electrical machine to rotate the engine;
    determining an engine crank torque;
    selectively controlling the torque output from the electrical machine based upon the engine crank torque; and,
    firing the engine only when rotational speed of the engine exceeds a threshold.

2. The method of claim 1, wherein determining the engine crank torque comprises executing an engine torque simulation model to determine the engine crank torque based upon present engine operating conditions.

3. The method of claim 2, wherein selectively controlling the torque output from the electrical machine based upon the engine crank torque comprises executing a feed-forward control scheme to substantially counteract variations in the engine crank torque determined by the engine torque simulation model.

4. The method of claim 3, further comprising selectively controlling the torque output from the electrical machine to substantially counteract variations in the engine crank torque resulting from in-cylinder pressure variations.

5. The method of claim 1, wherein generating a torque output from an electrical machine to rotate the engine comprises:
    determining a preferred engine operating speed required to restart the engine; and,
    controlling electrical energy transferred to the electrical machine based upon an input speed profile to achieve the preferred operating speed.

6. The method of claim 1, wherein firing the engine comprises injecting a quantity of fuel and initiating spark ignition to power the engine.

7. The method of claim 6, further comprising initiating the spark ignition at a spark timing to achieve operation at a substantially minimal engine torque output.

8. The method of claim 7, further comprising subsequently controlling the spark timing to achieve engine operation at a mean-best-torque output.

9. The method of claim 1, wherein firing the engine comprises injecting a quantity of fuel into the engine to power the engine.

10. Method for restarting an internal combustion engine during ongoing operation of a powertrain system comprising the internal combustion engine operatively connected to an electro-mechanical transmission and first and second electrical machines selectively operative to transmit torque therebetween, comprising:
    generating torque output from the first and second electrical machines to rotate the engine;
    determining an engine crank torque;
    executing a feed-forward control scheme to selectively control the torque output from the first and second electrical machines to rotate the engine based upon the engine crank torque; and,
    firing the engine only when rotational speed of the engine exceeds a threshold.

11. The method of claim 10, wherein determining the engine crank torque comprises executing an engine torque simulation model to determine the engine crank torque based upon present engine operating conditions.

12. The method of claim 11, further comprising executing the feed-forward control scheme substantially counteract variations in the engine crank torque determined by the engine torque simulation model.

13. The method of claim 10, wherein generating torque output from the first and second electrical machines to rotate the engine further comprises:
    determining a preferred engine operating speed required to restart the engine; and,
    controlling electrical energy transferred to the electrical machine based upon an input speed profile to achieve the preferred operating speed.

14. The method of claim 10, further comprising: controlling a damper clutch to lock rotation of the engine and the transmission prior to generating the torque output from the electrical machine to rotate the engine; and, unlocking the locked damper clutch prior to firing the engine.

15. The method of claim 10, wherein the torque output from the first and second electrical machines is limited based upon electrical energy capacity of an electrical energy storage device operative to supply electrical energy thereto.

16. The method of claim 10, wherein firing the engine when rotational speed of the engine exceeds a threshold comprises injecting a quantity of fuel and initiating spark ignition to power the engine when the engine comprises a spark-ignition engine.

17. The method of claim 16, further comprising initiating the spark ignition at a spark timing initially to generate a minimum engine torque output.

18. Article of manufacture, comprising a storage medium having a machine-executable program encoded therein for restarting an internal combustion engine of a hybrid powertrain during ongoing vehicle operation the powertrain comprising the internal combustion engine an electrical machine and an electro-mechanical transmission selectively operative to transmit torque therebetween, the program comprising:
    code to generate a torque output from the electrical machine to rotate the engine;
    code to determine an engine crank torque;

code to selectively control the torque output from the electrical machine based upon the engine crank torque; and, code to fire the engine only when rotational speed of the engine exceeds a threshold.

19. The article of manufacture of claim 18, wherein the code to determine engine crank torque comprises code to execute an engine torque simulation model to determine engine crank torque based upon present operating conditions.

20. The article of manufacture of claim 19, further comprising the engine compression torque simulation model to determine engine torque over a range of ambient and operating conditions.

21. The article of manufacture of claim 19, wherein the code to selectively control the torque output from the electrical machine comprises code to execute a feed-forward control scheme to substantially counteract variations in the engine crank torque determined by the engine torque simulation model.

22. The article of manufacture of claim 19, wherein the code to determine the engine crank torque comprises code to determine the engine crank torque coincident with an initiation of controlling torque output from the electrical machine to rotate the engine.

* * * * *